United States Patent Office 2,963,681
Patented Dec. 6, 1960

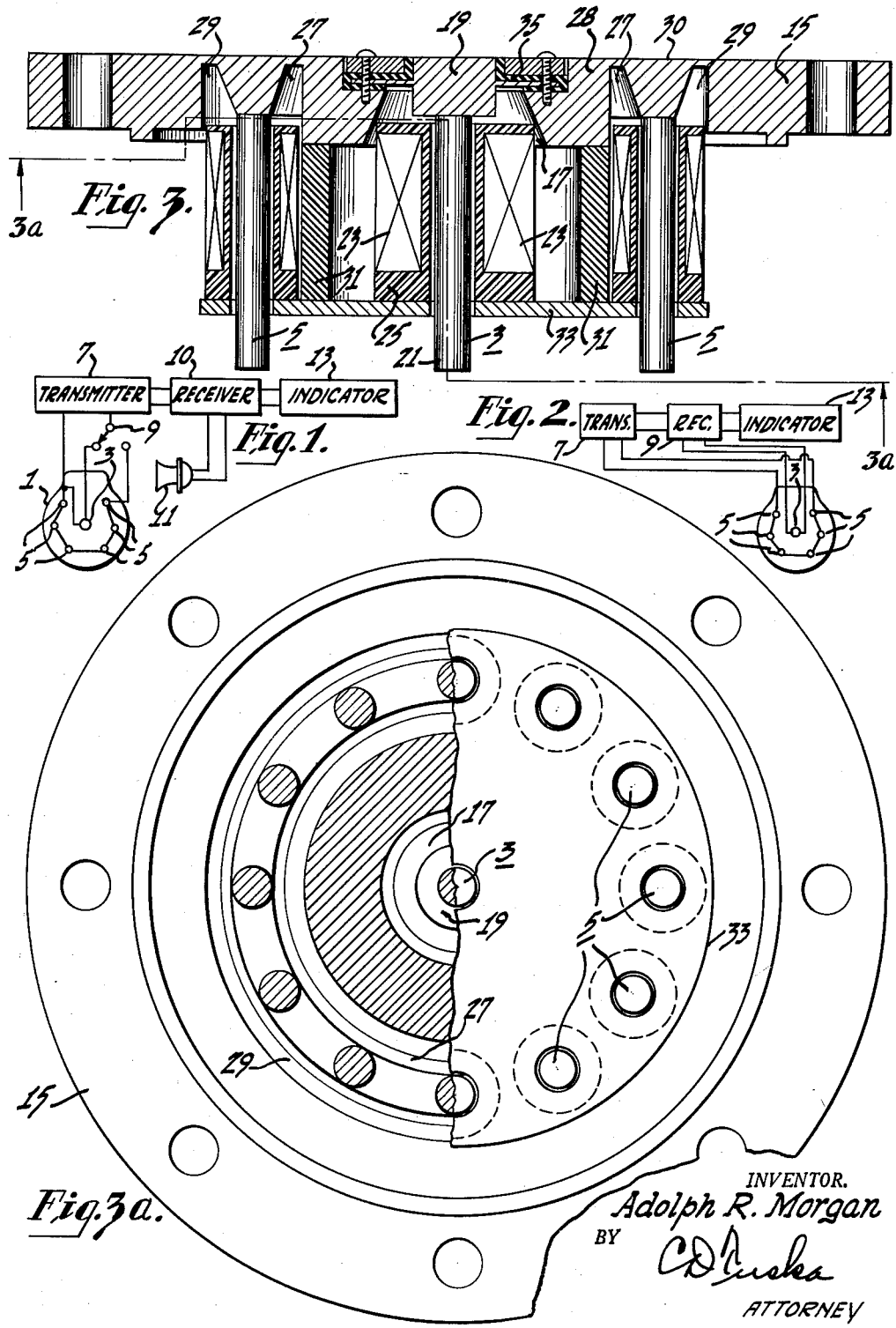

2,963,681

DUAL MAGNETOSTRICTIVE MICROPHONE

Adolph R. Morgan, Princeton, N.J., assignor, by mesne assignments, to the United States of America as represented by the Secretary of the Navy Filed Mar. 29, 1946, Ser. No. 657,967

5 Claims. (Cl. 340—8)

This invention relates to devices for converting or translating acoustic energy into electric energy and vice versa and particularly to such a device for use in underwater signalling which contains within a single structure a plurality of separate transducer elements adapted for independent operation.

Underwater signalling systems which employ acoustic sound waves for signalling or for locating objects such as submarines and the like under water are well known. For example, a patent issued to L. E. Barton, 2,355,502, for a Signal Indicator and Recorder, illustrates a system in which an electromechanical transducer is utilized to transmit through the water supersonic sound impulses which are reflected from the object to be detected, and received by the transducer at a subsequent time period which is a measure of the distance to the object. The transducers which have been employed in the past are utilized both for transmission and reception and in such case require elaborate systems for reducing the intensity of the transmitted signal in the receiver circuit. One system for protecting a receiver from excessive currents is described and claimed in a copending application of Amedeo D. Zappacosta, Serial No. 649,604, filed February 23, 1946, now Patent No. 2,449,358, and utilizes biasing voltages for reducing the receiver sensitivity during periods of transmission. In systems of the prior art identical transducer elements have been employed for both transmission and subsequent reception. It is the primary object of this invention to provide in a single electromechanical transducer assembly separate transducer elements which are independently operable with a minimum of mutual coupling so that one may be used for transmission and the other for reception without the necessity for providing protective devices in the receiver input, or for so reducing the undesired input to the receiver that the problem of protection is greatly reduced.

It is also frequently desirable to employ in underwater signalling systems a magnetostrictive transducer having different and selectable directional characteristics for radiation or reception. Thus, it may be desirable to transmit the acoustic energy in a narrow beam but to receive reflected energy throughout a wide angle, or vice versa. Alternatively, it is frequently desirable to transmit a narrow beam of acoustic energy during initial periods of operation, and subsequently to shift the mode of operation to one employing a wide directional characteristic. This feature is useful in detection of submarines. For example, during the initial stages of search a maximum power radiation in a given direction is desired, both to conserve energy and to permit the determination of the direction of the submarine. In later stages of the attack, when the submarine is more nearly under the attacking vessel and where it would normally be out of the range of the concentrated horizontal beam, the use of a broad radiation characteristic permits contact to be maintained. It is therefore a further object of this invention to provide an electromechanical transducer having two modes of operation, one providing a narrow directional characteristic or pattern for transmission or reception and the other providing a broad directional pattern, the two being independent and operable without mutual interference.

It is well known that the mode of vibration and dimensions of a diaphragm which is used to transfer mechanical energy to a medium such as water, affect the resultant radiation characteristic. Thus where the diaphragm vibrates as a unit and has a diameter equal to or less than a half wavelength of sound at the operating frequency in the medium concerned, a broad or non-directional pickup or radiation pattern will result. On the other hand, where the diaphragm is vibrating uniformly at all points, and has a diaphragm which is large with respect to the wavelength of sound in the medium concerned, a highly directional radiation or reception pattern will be produced. The practical attainment of these objectives with a single diaphragm having two modes of operation requires that mechanical coupling between the two effective diaphragms be reduced to a minimum, since spurious vibrations in parts adjacent to the effective diaphragm will modify the directional pattern of the sound collecting surface. It is therefore a still further object of this invention to provide an electromechanical transducer having a diaphragm capable of operating in two modes to produce a directional and a non-directional radiating pattern in which a mechanical filter is employed to isolate the two effective sections of the diaphragm to permit their independent operation in the manner described. A still further object of this invention is to provide an electromechanical transducer of improved sensitivity and which will translate acoustic into electric energy, or vice versa, with greater efficiency than has heretofore been possible. A still further object of this invention is to provide an acoustic piston capable of independent operation in two separate and distinct modes. A still further object of this invention is to provide an improved unitary diaphragm for an electromechanical transducer containing separate sections which are effectively independent in their operation.

The novel features that are considered characteristic of this invention are set forth with particularity in the appended claims. The invention, both as to its organization and method of operation, as well as additional objects and advantages thereof, will best be understood from the following description when read in connection with the accompanying drawings, in which Figure 1 is a block diagram illustrating the use of an electromechanical transducer to produce alternately broad and narrow transmission patterns;

Figure 2 illustrates an electromechanical transducer employing effectively separate sections for transmission and reception; and Figures 3 and 3a are plan and cross-section views of a portion of a magnetostrictive transducer.

While this invention will be described by a particular embodiment employing a magnetostrictive driving element, it is to be understood that the invention applies equally to transducers energized by piezo-electric crystals or other means, as is well known in the prior art.

Referring to Fig. 1, a magnetostrictive transducer 1 includes a centrally located driving element or transducer 3 and a plurality of similar elements 5 uniformly spaced about the central element, and all mounted on a common diaphragm, the details of which will be explained subsequently. A transmitter 7 has its output connected by means of a selector switch 9 either to the central transducer 3 or to the outer transducer elements 5 connected in series. A receiver 10 is connected to a separate pickup device 11 which may be any suitable microphone adapted for the reception of acoustic energy in the medium concerned. An indicator 13 is coupled to the output of the receiver for measuring the echo time in accordance with well known practice. By operating the switch 9 it is possible to connect the transmitter to the single central transducer 3 to obtain a broad directional radiation pattern, or, by employing the remaining transducer elements 5, to obtain a narrow directional pattern, as desired.

Figure 2 illustrates the employment of the dual magnetostrictive transducer in another manner. In this case the transmitter 7 is connected permanently to the outer transducer elements 5 while the receiver input is connected to the central element 3. This provides wide range reception and efficient decoupling between the transmitter and receiver elements as will be disclosed subsequently.

Referring now to Figs. 3 and 3a, a magnetostrictive transducer embodying the principles and objects outlined above is shown in detail.

A metallic diaphragm 15 is mounted by its outer edge in a metallic waterproof casing, not shown, in accordance with the usual practice. The maximum thickness of the diaphragm is relatively small with respect to a wavelength at the operating frequency which may be, for example, 25 or 30 kilocycles. An annular groove 17, cut or cast into the inner face of the diaphragm, defines the small, circular central portion 19 on which is mounted the central electromechanical transducer 3 which, in the present case, consists of a tube or rod 21 of nickel, or other magnetostrictive material, surrounded by an energizing coil 23 wound on an insulating coil form 25. Outside of the annular groove 17 is a second annular groove 27, the space between the two grooves constituting a mass 28, the purpose of which will be described hereinafter. In order to increase the effectiveness of the mass, it is desirable that this portion of the diaphragm be thicker than other portions. A third annular groove 29 is provided outside of and concentric with the second groove 27. The diaphragm portion between the second and third grooves supports a plurality of magnetostrictive elements 5 which are uniformly spaced on the diaphragm. In the case illustrated, twelve such elements are shown, and these are the same elements 5 illustrated schematically in Figs. 1 and 2.

Magnetizing flux for the operation of the magnetostrictive elements is provided by means of an annular permanent magnet 31 positioned between the inner and outer magnetostrictive transducers 3 and 5 and mounted on the diaphragm so as to add to the mass of the portion 28 between the first annular groove 17 and the second annular groove 27. A flux distribution plate 33 is provided to direct the magnetic flux from the magnet 31 through the various magnetostrictive elements. The length of the nickel tubes is adjusted to mechanical resonance at the operating frequency, considering the effect of the mass and compliance of the diaphragm, to provide maximum mechanical vibration in the direction of the longitudinal axis of the nickel tubes for maximum sensitivity. The mechanical vibration will occur about a nodal point which will fall within the limits of the nickel tubes.

When the central electromechanical transducer is energized, the central portion 19 of the diaphragm 15 will be directly energized, and constitutes an effective piston diaphragm having a diameter approximately equal to one-half wavelength. The transfer of energy to the outer portions of the diaphragm 15 is minimized by a low pass filter comprising the diaphragm mass 28, which is an acoustic inertance, between the annular grooves 17 and 27 and the compliance of the diaphragm 15 at the thin portions created by the two grooves. The thin portions of the diaphragm 15 at the base of the annular grooves may be considered as compliant webs which support the operative portion of the diaphragm. The compliance of the webs reduces the coupling between the inner portion 19 of the diaphragm 15 and the adjacent section. The mass of the intermediate portion, through its inertia, further tends to reduce the transfer of mechanical energy. The combination of mass or inertance and compliance may be considered the mechanical equivalent of an electrical low pass filter having inductance and capacitance which reduce the transfer of high frequency energy. The compliance and inertance may be calculated, using an electrical analogy, to minimize the mechanical coupling to the smallest practicable amount. The loss of energy induced in the transducer by the reception of acoustic waves impinging on the diaphragm is minimized for the same reasons.

The annular surface 30 of the diaphragm 15, between grooves 27 and 29, may also be considered as an independent piston diaphragm operable with the outer ring of transducer elements 5 to transfer mechanical energy to or from the adjacent medium when the transducers are suitably energized either by the application of high frequency currents to the energizing coils or by the acoustic waves impinging on the diaphragm. Since the effective diameter of the annular diaphragm is large with respect to a wave length, a highly directional radiation or reception pattern is produced. Annular groove 29, together with the mass of the diaphragm between this groove and the supporting casing also constitute an effective filter to prevent the transfer of mechanical energy from the transducer to the outer casing.

In order to further decrease the mechanical coupling it may be desirable to isolate the central diaphragm section 19 from the outer portions of the principal diaphragm 15 by means of a rubber gasket 35. This rubber gasket absorbs the vibration of the central diaphragm 19, thus reducing the transfer of energy to the mass adjacent thereto and so reducing the coupling between the central diaphragm and the annular diaphragm employed in directional operation.

I have thus described a magnetostrictive transducer which provides in a single unit two transducers which are essentially independent of each other and which may be separately employed, either alternately or simultaneously to provide two separate and distinct modes of operation with a minimum of mutual interference. While I have described diaphragm 15 as a "unitary diaphragm," I in no wise intend this as a limitation that the diaphragm must be a single casting or milled from a single piece of material. The term is intended merely to define the diaphragm as a single structure capable of operation in a plurality of modes. Thus, the diaphragm may be constructed by mounting annular rings, corresponding to the thicker portions of the diaphragm, on a thin sheet of steel or other material, to produce a unitary structure having the required cross-section.

What I claim is:

1. A device of the class described including a diaphragm, a plurality of electromechanical transducers mounted thereon, means providing an external electrical connection to one of said transducers, other means providing an external electrical connection to the remaining transducers, and means for minimizing mechanical coupling between said one transducer and said remaining transducers, said means comprising a mechanical filter having compliance and inertance so constructed and arranged that the vibration of a section of said diaphragm cooperating with said one transducer will not be transmitted to the section of said diaphragm cooperating with said remaining transducers, whereby said one transducer and said remaining transducers may independently and simultaneously respond to or produce vibrations in separate sections of said diaphragm.

2. A device of the character described in claim 1 in which said one transducer and the associated diaphragm portion have a non-directional radiation characteristic and said other transducers together with their associated diaphragm portions have a directional radiation characteristic, and in which said compliance comprises two concentric annular regions in which said diaphragm is substantially thinner than at other regions, and said inertance comprises an annular region between said two concentric annular regions in which said diaphragm is substantially thicker than at other regions.

3. A device of the class described including a diaphragm, a first electromechanical transducer centrally mounted thereon; a plurality of additional electromechanical transducers mounted thereon in uniformly spaced relation to said first element, means providing external connection from the first of said transducers to a utilization device, separate means providing an external connection from said plurality of transducers to a source of energy and means for minimizing the transfer of vibratory energy from said plurality of transducers to said first transducer, said means comprising two concentric annular regions of said diaphragm between said first and said plurality of transducers in which said diaphragm is relatively thin, and an intervening mass between said concentric annular regions having relatively great mass.

4. A device of the character described in claim 1 in which said transducers and their associated diaphragm sections are tuned to mechanical vibratory resonance at a predetermined frequency, the effective diameter of said central section is one half the wavelength of sound in water at said frequency, and the effective diameter of said second section is one and one-half wavelengths of sound in water at said frequency.

5. A device for the transmission and reception of acoustic energy comprising a diaphragm having outer and inner faces, the outer face for contacting the medium of transmission being substantially flat and the inner face having an inner concentric annular groove and two outer concentric annular grooves, an electromechanical transducer mounted centrally on the inner face of said diaphragm within said inner groove, and a plurality of electromechanical transducers mounted on the inner face of said diaphragm between said outer concentric grooves, the thickness of said diaphragm within said inner groove and between said outer grooves being relatively small with respect to the wavelength of the acoustic energy and adapted to vibrate so as to produce a loop of motion in a direction normal to said faces and a nodal point exterior to said diaphragm, the thickness of said diaphragm between said inner groove and the adjacent outer groove being thicker than the other portions.

References Cited in the file of this patent

UNITED STATES PATENTS

| | | |
|---|---|---|
| 2,063,950 | Steinberger | Dec. 15, 1936 |
| 2,405,187 | Benioff | Aug. 6, 1946 |
| 2,405,472 | Tuttle | Aug. 6, 1946 |
| 2,405,604 | Pope | Aug. 13, 1946 |
| 2,407,271 | Hart | Sept. 10, 1946 |
| 2,407,329 | Turner | Sept. 10, 1946 |